(12) United States Patent
Bleisteiner et al.

(10) Patent No.: US 9,608,439 B2
(45) Date of Patent: Mar. 28, 2017

(54) METHOD FOR OPTIMIZING THE YIELD OF A PARTIALLY SHADED PHOTOVOLTAIC ARRAY

(71) Applicants: Thomas Bleisteiner, Rengersricht (DE); Marc Haug, Leipzig (DE); Karsten Reiher, Wilhermsdorf (DE)

(72) Inventors: Thomas Bleisteiner, Rengersricht (DE); Marc Haug, Leipzig (DE); Karsten Reiher, Wilhermsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 498 days.

(21) Appl. No.: 14/182,341

(22) Filed: Feb. 18, 2014

(65) Prior Publication Data

US 2014/0232206 A1   Aug. 21, 2014

(30) Foreign Application Priority Data

Feb. 19, 2013 (DE) ........................ 10 2013 202 600

(51) Int. Cl.
  *H04B 5/00* (2006.01)
  *H02J 1/00* (2006.01)
  (Continued)

(52) U.S. Cl.
  CPC .................. *H02J 1/00* (2013.01); *G05F 1/67* (2013.01); *H02J 3/385* (2013.01); *Y02E 10/58* (2013.01); *Y10T 307/865* (2015.04)

(58) Field of Classification Search
  CPC ........................................................ G05F 1/67
  USPC ......................................................... 307/151
  See application file for complete search history.

(56) References Cited

U.S. PATENT DOCUMENTS

| 8,754,627 B1* | 6/2014 | Le .............................. G05F 1/67 323/299 |
| 2010/0213761 A1* | 8/2010 | McDonald ................ G05F 1/67 307/18 |

(Continued)

FOREIGN PATENT DOCUMENTS

| CN | 102163067 A | 8/2011 |
| CN | 102624285 A | 8/2012 |
| CN | 102918746 A | 2/2013 |
| DE | 102010036966 A1 | 2/2012 |
| JP | H1091259 A | 4/1998 |
| WO | 2006081038 A2 | 8/2006 |

OTHER PUBLICATIONS

Oshiro et al, "A MPPT Control Method for Stand-Alone Photovoltaic System in Consideration of Partial Shadow", Dec. 2011, IEEE PEDS, pp. 1010-1014.*

(Continued)

*Primary Examiner* — Adi Amrany
(74) *Attorney, Agent, or Firm* — Beusse Wolter Sanks & Maire

(57) ABSTRACT

A method for optimizing the yield of a photovoltaic array with an inverter is provided. The method includes: a) cyclically measuring a current (Igiv) and a DC link voltage (U) when controlling the inverter by a MPP method (Maximum Power Point) and storing a measured current value, b) lowering the DC link voltage (U) to a value that exceeds by no more than 100% a minimum DC link voltage (Umin) admissible for operation of the inverter, c) measuring a current (Ired) with a reduced DC link voltage and comparing it with a previously stored value at a given time for the current (Igiv), d) if a prescribed threshold for a difference between the two currents (Ired, Igiv) is exceeded, a searching process for a global MPP (Maximum Power Point) is initiated, e) otherwise, operation is continued at a power maximum (MPP) with a last-stored current value for the current (Igiv).

11 Claims, 4 Drawing Sheets

(51) Int. Cl.
*G05F 1/67* (2006.01)
*H02J 3/38* (2006.01)

(56) References Cited

U.S. PATENT DOCUMENTS

| | | | |
|---|---|---|---|
| 2013/0016536 A1* | 1/2013 | Ehlmann | H02J 3/385 363/34 |
| 2013/0041511 A1* | 2/2013 | Kohno | G05F 1/67 700/286 |
| 2013/0093193 A1* | 4/2013 | Schmidt | H02J 3/38 290/1 R |
| 2013/0134955 A1 | 5/2013 | Bettenwort et al. | |
| 2013/0154394 A1 | 6/2013 | Mildenstein et al. | |
| 2013/0197834 A1* | 8/2013 | Maki | G01R 21/02 702/60 |
| 2013/0257155 A1* | 10/2013 | Judkins | H02S 50/00 307/43 |

OTHER PUBLICATIONS

Patel et al, "Maximum Power Point Tracking Scheme for PV Systems Operating Under Partially Shaded Conditions", Apr. 2008, IEEE, vol. 55, No. 4, pp. 1689-1698.*
Chin et al, "Effect of Partially Shaded Conditions on Photovoltaic Array's Maximum Power Point Tracking", Mar. 2008, University of Malaysia Sabah, School of Engineering and Information Technology, pp. 52-59.*
Ji et al, "A Real Maximum Power Point Tracking Method for Mismatching Compensation in PV Array Under Partially Shaded Conditions", Apr. 2011, IEEE, vol. 26, No. 4, pp. 1001-1009.*
Dhople S. V. et al; "A Global Maximum Power Point Tracking Method for PV Module Integrated Converters"; Engergy Conversion Congress and Exposition (ECCE), 2012 IEEE; pp. 4762-4767; 2012.
CN Office Action dated Mar. 23, 2016, for CN application No. 201410052709.6.

* cited by examiner

METHOD FOR OPTIMIZING THE YIELD OF A PARTIALLY SHADED PHOTOVOLTAIC ARRAY

CROSS REFERENCE TO RELATED APPLICATIONS

This application claims the benefit of German Application No. DE 102013202600.5 filed Feb. 19, 2013, incorporated by reference herein in its entirety.

FIELD OF INVENTION

The present invention relates to a method for optimizing the yield of a partially shaded photovoltaic array.

BACKGROUND OF INVENTION

Photovoltaic arrays (PV arrays) are usually operated on the basis of a control method in which the maximum energy yield is obtained at the maximum power MPP (Maximum Power Point), for which reason the term MPP method is also used for this. In the case of partial shading of a photovoltaic array due to shading of one or more photovoltaic modules, the current-voltage characteristic (IU characteristic) of the photovoltaic array concerned changes, since the shaded photovoltaic modules represent a high ohmic resistance. Referred to here as the voltage is the DC link voltage U that can be controlled by means of an inverter. This results in a correspondingly low photovoltaic current and a strong voltage drop across the shaded photovoltaic modules. In order to avoid this, the current is made to pass by the shaded photovoltaic modules in each case with the aid of a bypass diode, which makes operation with a comparatively higher current possible. The alteration of the IU characteristic as a result of shading has the effect that the energy yield obtained according to the IU characteristic no longer has only one maximum, but a number of maxima (MPPs) as shown in FIG. 1. The control of the photovoltaic inverter on the basis of the MPP method is performed with what is known as an MPP tracker. In this case, the DC link voltage is set such that the power maximum MPP is obtained.

Without searching processes, it is possible that only one local maximum is found, which may have the consequence of considerable losses in yield. If, however, a searching process is started without there being any shading, losses in yield occur. However, it is intended to avoid this as far as possible.

WO 2006/081038A2 discloses a system and a method for determining a variable characteristic value within the operating range. FIG. 4 of WO 2006/081038A2 shows a searching process for use when there is partial shading of a photovoltaic array, a process in which a full search is carried out over the characteristic at regular intervals. This involves the inverter of the photovoltaic installation running through the entire operating range, and thereby using the current as the manipulated variable of the control.

According to DE 10 2010 036 966 A1, a search is carried out, depending on the probability that the operating point used at the given time is no longer at the global maximum. Here too, the inverter of the photovoltaic installation runs through the entire operating range. The search for the global maximum on the basis of a voltage difference between a past global maximum and a global maximum at the given time is used as the initialization of the search.

A further document (DHOPLE, BELL, DAVOUDI, CHAPMAN, DOMINGUEZ-GARCIA: A global maximum power point tracking method for PV module integrated converters. In: Energy Conversion Congress and Exposition (ECCE), 2012 IEEE, 2012, pp. 4762-4767) shows a device in which a search for the global maximum is only carried out when at least one bypass diode is forward biased.

SUMMARY OF INVENTION

The invention is based on an object of proposing a method for optimizing the yield of a photovoltaic array that ensures least possible losses in yield when there is shading of photovoltaic modules.

This object is achieved by a method with the features according to the independent claim. This includes the following:

a) cyclically measuring the current Igiv and the DC link voltage U when controlling the inverter by the MPP method (Maximum Power Point) and storing the measured current value, b) lowering the DC link voltage U to a value that exceeds by no more than 100% the minimum value Umin of the DC link voltage admissible for the operation of the inverter, c) measuring the current Ired with the reduced DC link voltage and comparing it with the previously stored value at the given time for the current Igiv, d) if a prescribed threshold for the difference between the currents Ired and Igiv is exceeded, a searching process for a global MPP (Maximum Power Point) is initiated, e) otherwise, operation is continued at the MPP with the last-stored current value for the current Igiv.

BRIEF DESCRIPTION OF THE DRAWINGS

An exemplary embodiment of the invention is explained in more detail below on the basis of a drawing, in which.

DETAILED DESCRIPTION OF INVENTION

Figure 1:
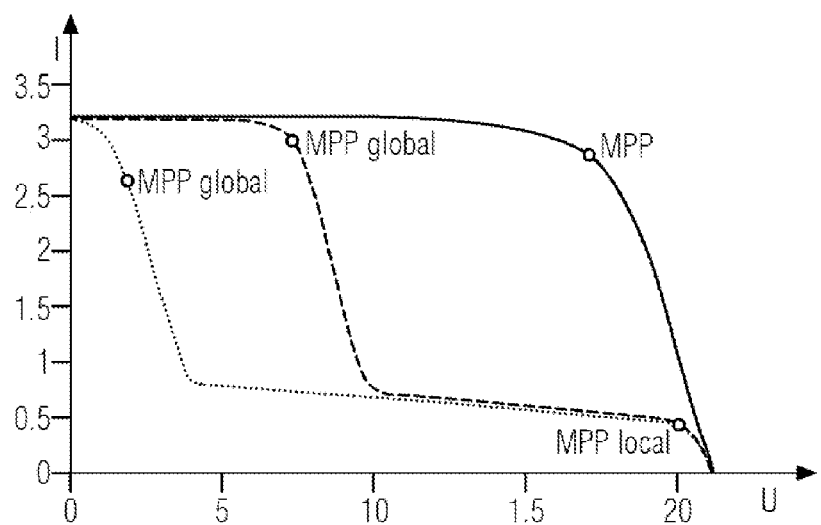
FIGS. 1 and 2 show the influence of partial shading of a photovoltaic array on its IU characteristic (current-voltage characteristic)
Figure 5:
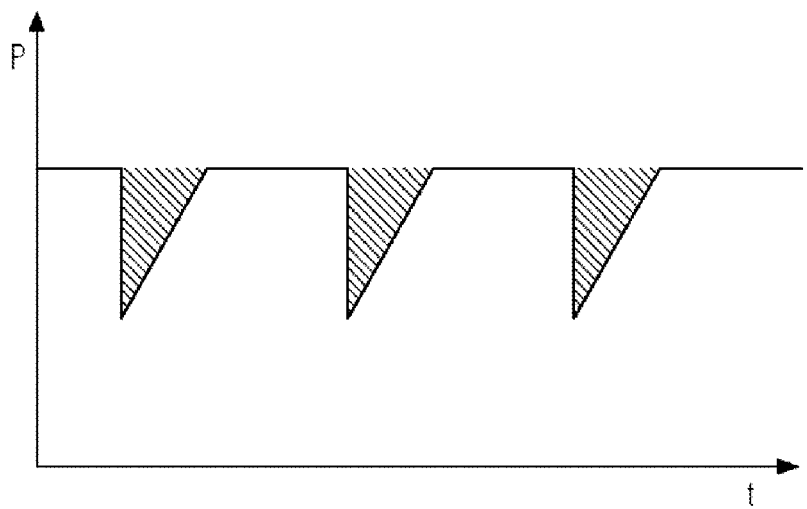
FIG. 5 shows the variation in the power output with accompanying losses in yield when cyclically scanning the IU characteristic in the search for a global power maximum.

With ideal photovoltaic arrays (PV arrays) without partial shading of the photovoltaic modules, as represented by the solid line in FIG. 1, the maximum energy yield (Maximum Power Point MPP) is relatively easy to determine by commonly used searching processes. In the case of partial shading, however, a number of maxima are obtained as shown in FIG. 1. Thus, the operating point found at the given time may only represent a local power maximum MPPlocal. The global power maximum MPPglobal, however, lies at a different point and is also dependent on whether a connection of the photovoltaic modules to a bypass diode exists— as represented by the dashed line—or not (see dotted line). In order to find the global power maximum MPPglobal, the local power maximum MPPlocal must be abandoned, for example by running through the entire IU characteristic (current-voltage characteristic) in scanning steps to be correspondingly defined, it not being certain a priori whether there is a global power maximum MPPglobal at all. This running through the IU characteristic takes place outside the MPP and entails losses in yield as shown in FIG. 5. The losses in yield vary in degree, depending on how often the "possibly present" but not "definitely present" maximum (caused by the shading) is sought.

Commonly used shading algorithms use the power output of the PV array at the given time as a reference. In certain cases, such algorithms do not find the global power maximum MPPglobal. In the case of these algorithms, the global power maximum MPPglobal may be skipped. The power point adopted as a result may be lower than the power point before the shading search. Accordingly, control is directed at the local power maximum MPPlocal and not at the global power maximum MPPglobal.

If a photovoltaic module in a series connection is shaded, the current falls very sharply on account of the dependence of the IU characteristic on the irradiation. Since the current must flow through all of the photovoltaic modules connected in series, all of the other photovoltaic modules no longer operate at their MPP.

Figure 2:
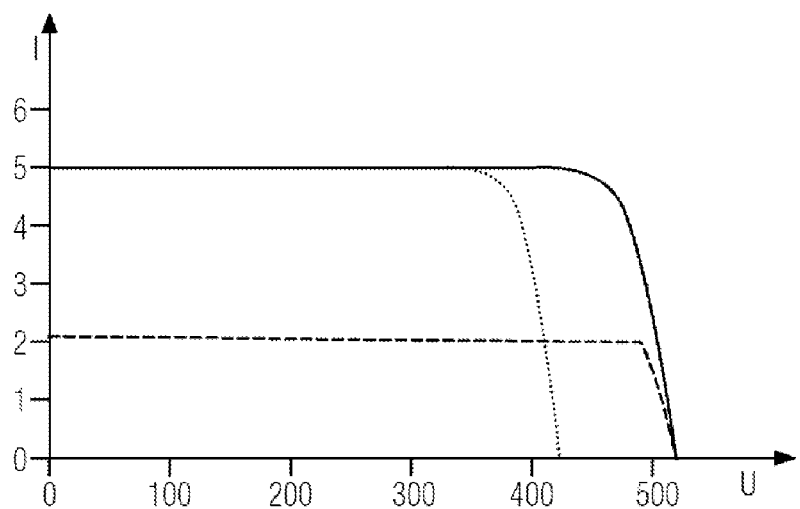

FIG. 2 shows the IU characteristic of a PV generator comprising 16 photovoltaic modules that are unshaded (solid characteristic). When there is shading of 3 photovoltaic modules, the current falls (dashed characteristic). The shaded photovoltaic modules represent a great ohmic resistance, which limits the current. Since individual cells may be destroyed due to the strong development of heat, bypass diodes that conduct the current past the photovoltaic module are used in a known way in the photovoltaic module. If the bypass diode comes into action, the photovoltaic module no longer contributes to the power output of the PV generator. The voltage of this photovoltaic module is absent in the overall voltage, but a great current can safely flow again. The IU characteristic under shading with an active bypass diode is represented by dotted lines in FIG. 2.

Figure 3:
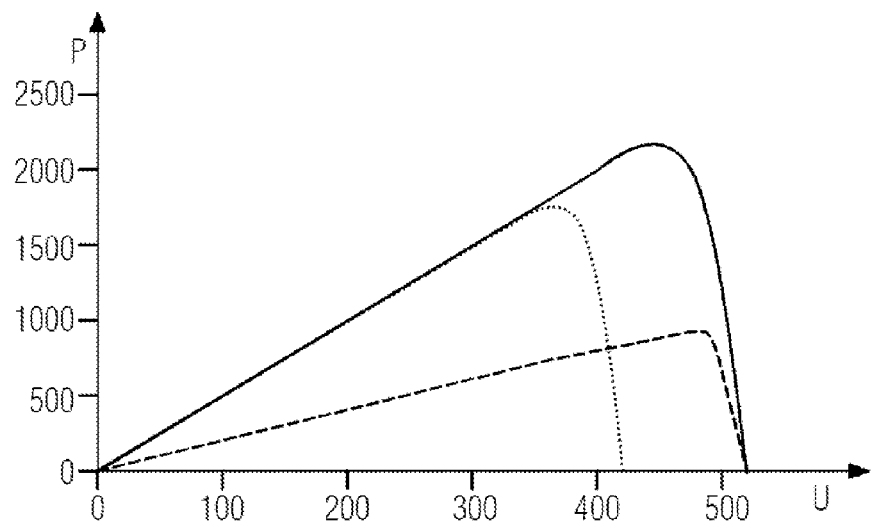
FIG. 3 shows the influence of partial shading of a photovoltaic array on its power characteristic.

FIG. 3 reveals the respective variations of the power output, the solid line representing the case without shading. A typical shading scenario is as follows:

The shading is initially slight, and therefore the current falls only a little. The MPP thereby shifts to greater voltages. The MPP tracker in the inverter follows this direction and in the shading situation does not get past the small power maximum (dashed curve in FIG. 2).

It depends on the algorithm of the MPP tracker whether it finds the much greater power maximum (dotted curve), which is established if the bypass diodes of the shaded photovoltaic modules are forward biased. The voltage U (DC link voltage) at the power maximum MPP is much smaller here, since it is indeed only the unshaded photovoltaic modules that make any substantial contribution to the overall voltage. When the bypass diodes are forward biased, the remaining overall voltage of the unshaded photovoltaic modules must still be sufficient for the operating range of the inverter. If this is not the case, the MPP tracker cannot find the power maximum.

Figure 4:
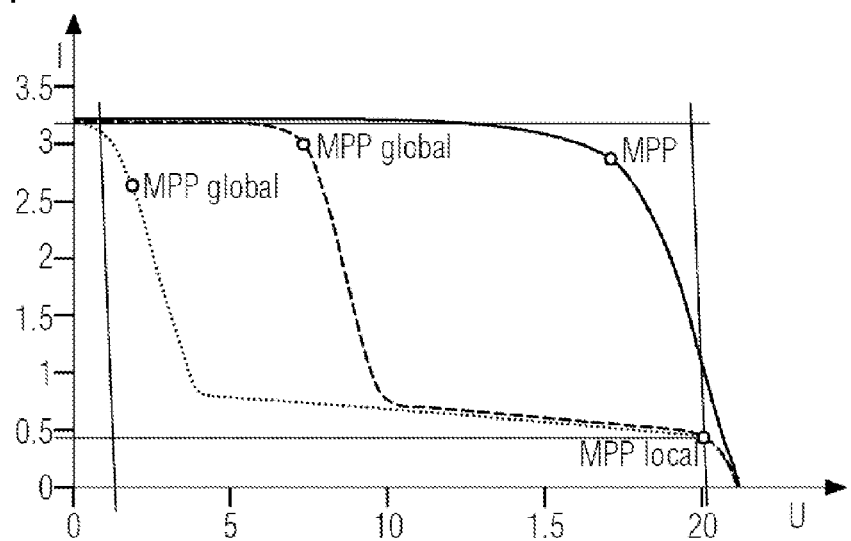
FIG. 4 shows the influence of partial shading of a photovoltaic array on the current IMPPmin with a small DC link voltage UMPPmin.

With partial shading of the PV array, the IU characteristic changes in the form that the current Imin at the minimum possible DC link voltage Umin (determined by the characteristic data of the inverter) is possibly considerably greater than at the local power maximum MPPlocal at the given time. As a result, partial shading can be detected as shown in FIG. 4. This means that the current measured with the minimum admissible DC link voltage Umin or even with DC link voltages slightly above that gives an indication of when there is shading. The DC link voltage U is lowered to a value that experience has found exceeds by no more than 20% the minimum DC link voltage Umin admissible for the operation of the inverter. The optimal situation would be to set the DC link voltage to Umin, since the global power maximum MPPglobal may lie close to Umin.

In FIGS. 1, 2 and 4, the voltage U is plotted in volts on the x axis and the current I is plotted in amperes on the y axis. In FIG. 3, the voltage U is plotted in volts on the x axis and the power output P is plotted in watts on the y axis.

Figure 6:
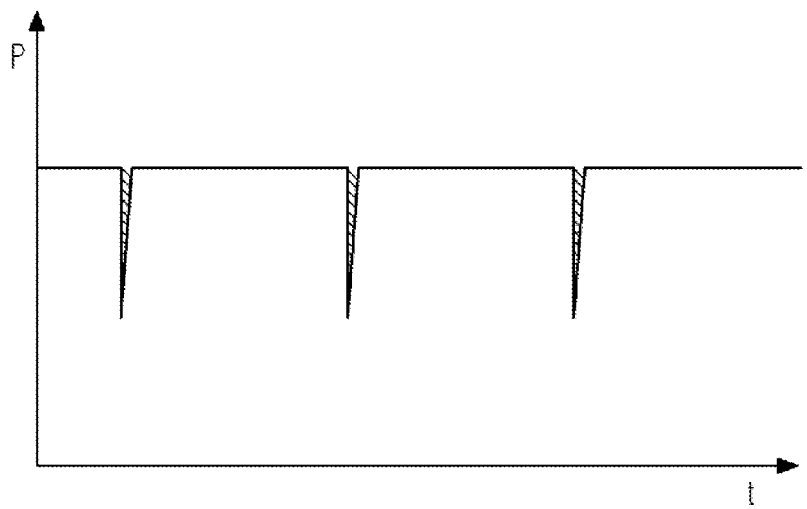
FIG. 6 shows the variation in the power output with accompanying losses in yield caused by a cyclical jump to a minimum MPPmin with a small DC link voltage UMPPmin and FIG. 7 shows a flow diagram of the method according to aspects of the invention for optimizing the yield of a photovoltaic array with an inverter.

A power measurement is not a significant feature, since the power output, for example at the minimum possible MPP, is lower than the local MPP at that time. Therefore, the entire characteristic would have to be scanned for this in order to establish whether there is another global power maximum. If not, a certain yield is lost due to the scanning outside the MPP as shown in FIG. 5. On the other hand, the brief jump for the current measurement as shown FIG. 6 leads only to a minimal loss in yield. In FIGS. 5 and 6, the time t is plotted on the x axis and the power output P is plotted on the y axis.

The comparison of the current measurement has the advantage that the MPP is only left for a short time and the last MPP is subsequently resumed if the measured currents are approximately the same.

Figure 7:
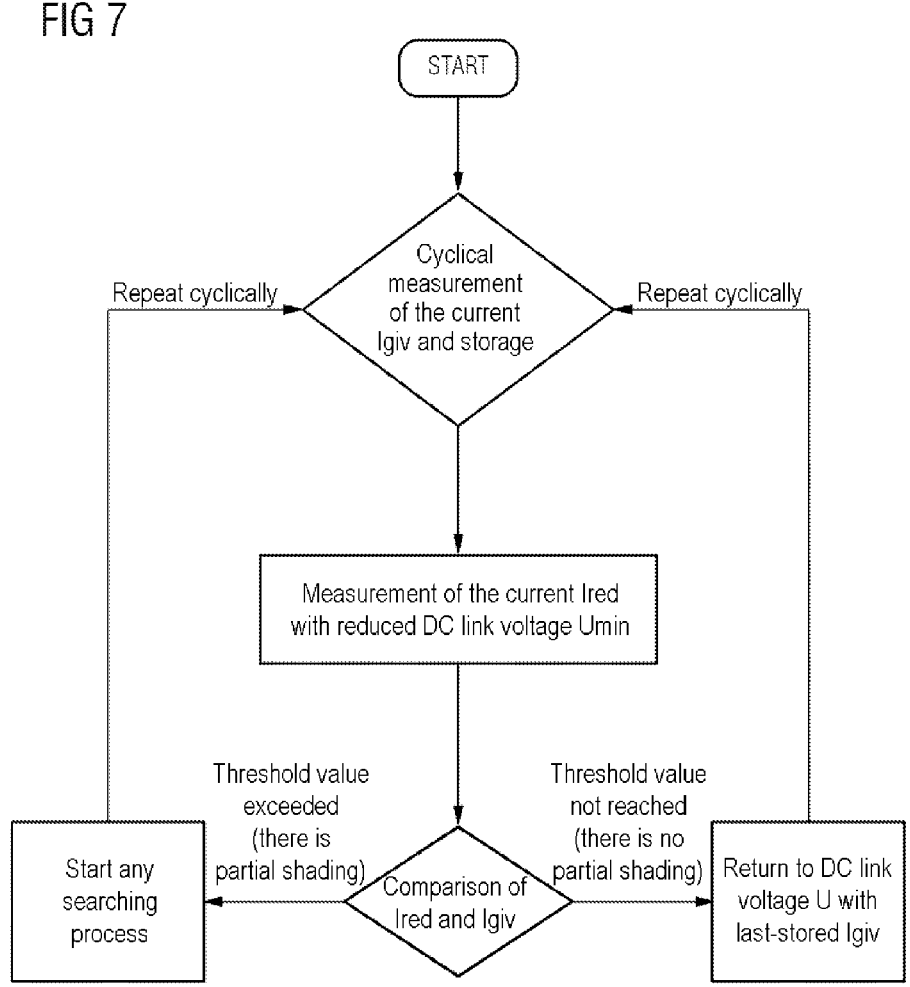

In the flow diagram that is shown in FIG. 7, the method for optimizing the yield of a photovoltaic array with an inverter is summarized. It substantially includes the following:

a) cyclically measuring the current Igiv and the DC link voltage U when controlling the inverter by the MPP method (Maximum Power Point) and storing the measured current value, b) lowering the DC link voltage U to a value that exceeds by no more than 100% the minimum DC link voltage Umin admissible for the operation of the inverter, c) measuring the current Ired with the reduced DC link voltage and comparing it with the previously stored value at the given time for the current Igiv, d) if a prescribed threshold for the difference between the currents Ired and Igiv is exceeded, a searching process for a global MPPglobal (Maximum Power Point) is initiated, e) otherwise, operation is continued at the MPP with the last-stored current value for the current Igiv.

In this method there is a cyclical measurement of the current I, i.e. the current existing at the given time of the measurement, for which reason this current is identified by Igiv. The DC link voltage U is subsequently lowered to a value that exceeds by no more than 100% the minimum DC link voltage Umin admissible for the operation of the inverter. Ired denotes the current with the reduced or lowered DC link voltage U. This current is compared with the last-stored value of the current at the given time Igiv. Experience shows that the current Ired is about 20% higher than the stored value of the current Igiv. If this threshold is exceeded, a searching process for a global power maximum MPPglobal is initiated. It is not possible to give an exact percentage, since the percentage value may be fixed customer-specifically or plant-specifically.

The invention claimed is:

1. A method for optimizing the yield of a photovoltaic array with an inverter, comprising:

a) cyclically measuring a current (Igiv) and a DC link voltage (U) when controlling the inverter by a MPP method (Maximum Power Point) and storing a measured current value, b) lowering the DC link voltage (U) to a value within a range extending from a minimum DC link voltage admissible for operation of the inverter (Umin) to two times Umin, c) measuring a current (Ired) with a reduced DC link voltage and comparing it with a previously stored value at a given time for the current (Igiv), d) if a prescribed threshold for a difference between the two currents (Ired, Igiv) is exceeded, a searching process for a global MPP (Maximum Power Point) is initiated, e) otherwise, operation is continued at a power maximum (MPP) with a last-stored current value for the current (Igiv).

2. The method of claim 1, wherein in step b) the DC link voltage (U) is lowered to a value within a range extending from Umin to 20% more than Umin.

3. The method of claim 1, wherein in step b) the DC link voltage (U) is lowered to Umin.

4. A method comprising:
controlling a DC link voltage of a photovoltaic array with an inverter;
storing a current produced by the photovoltaic array at a given time (Igiv);
lowering the DC link voltage to a value that is no less than a minimum DC link voltage admissible for the operation of the inverter (Umin) and that is no more than two times the minimum DC link voltage admissible for the operation of the inverter, and measuring a current produced by the array at the lowered DC link voltage (Ired); and
if a difference between Ired and Igiv exceeds a predetermined threshold, initiating a searching process for a global Maximum Power Point.

5. The method of claim 4, wherein the DC link voltage is lowered to a value that is no more than 20% more than Umin.

6. The method of claim 4, wherein the DC link voltage is lowered to Umin.

7. The method of claim 4, wherein the searching process for a global Maximum Power Point is initiated if the difference between Ired and Igiv exceeds 20% of Ired.

8. A method comprising:
controlling a DC link voltage of a photovoltaic array with an inverter to maintain a Maximum Power Point (MPP);
storing a value of a current produced by the photovoltaic array at a given time (Igiv);
lowering the DC link voltage to a value no more than twice a minimum DC link voltage admissible for the operation of the inverter, and measuring a current produced by the array at the lowered DC link voltage (Ired); and
initiating a searching process for a global Maximum Power Point (global MPP) if a difference between Ired and Igiv exceeds a prescribed threshold, otherwise, returning operation of the photovoltaic array to the stored Igiv.

9. The method of claim 8, wherein the DC link voltage is lowered to a value no more than 20% more than a minimum DC link voltage admissible for the operation of the inverter.

10. The method of claim 8, wherein the DC link voltage is lowered to the minimum DC link voltage admissible for the operation of the inverter.

11. The method of claim 8, wherein the prescribed threshold is 20% of Ired.

* * * * *